United States Patent [19]

Roelofs et al.

[11] Patent Number: 5,882,563
[45] Date of Patent: Mar. 16, 1999

[54] PROCESS FOR MAKING FIBRES FROM POLY(P-PHENYLENE TEREPHTHALAMIDE)

[75] Inventors: Wilhelmus Marie Roelofs, Dieren; Antonius Hendrikus Maria Spieker, Zieuwent; Johannes Gerrit Waringa, Dieren, all of Netherlands

[73] Assignee: Akzo Nobel NV, Arnhem, Netherlands

[21] Appl. No.: 945,503

[22] PCT Filed: Apr. 25, 1996

[86] PCT No.: PCT/EP96/01731

§ 371 Date: Oct. 27, 1997

§ 102(e) Date: Oct. 27, 1997

[87] PCT Pub. No.: WO96/34732

PCT Pub. Date: Nov. 7, 1996

[30] Foreign Application Priority Data

May 2, 1995 [NL] Netherlands ............. 1000276

[51] Int. Cl.⁶ ............. B29C 47/76; D01D 1/10; D01F 6/60
[52] U.S. Cl. ............. 264/102; 264/184; 264/211.22; 264/211.23
[58] Field of Search ............. 264/102, 184, 264/211.22, 211.23

[56] References Cited

U.S. PATENT DOCUMENTS

| | | | |
|---|---|---|---|
| 3,414,645 | 12/1968 | Morgan, Jr. | 264/184 |
| 3,873,072 | 3/1975 | Blackmon | 366/80 |
| 4,016,236 | 4/1977 | Nagasawa et al. | 264/184 |
| 4,320,081 | 3/1982 | Lammers | 264/184 |
| 5,094,690 | 3/1992 | Zikeli et al. | 106/200.2 |
| 5,121,992 | 6/1992 | List et al. | 366/303 |
| 5,147,135 | 9/1992 | List et al. | 366/303 |
| 5,246,776 | 9/1993 | Meraldi et al. | 264/184 X |
| 5,534,113 | 7/1996 | Quigley et al. | 159/49 |

FOREIGN PATENT DOCUMENTS

| | | |
|---|---|---|
| 356419 | 2/1990 | European Pat. Off. . |
| 451747 | 10/1991 | European Pat. Off. . |
| 6810515 | 10/1968 | Netherlands . |
| 7904495 | 12/1980 | Netherlands . |
| WO 91/00381 | 1/1991 | WIPO . |
| WO 92/07120 | 4/1992 | WIPO . |
| WO 94/06530 | 3/1994 | WIPO . |

OTHER PUBLICATIONS

Derwent Patent Abstract 91–036767/05 (1991).
Derwent Patent Abstract 19,369Q (1969).
Derwent Patent Abstract 91–304786/42 (1991).
Derwent Patent Abstract 87–228715 (1987).
Derwent Patent Abstract 90–107892 (1990).
Derwent Patent Abstact 83–751004/35 (1983).
Derwent Patent Abstract 90–061032/09 (1990).

*Primary Examiner*—Leo B. Tentoni
*Attorney, Agent, or Firm*—Richard P. Fennelly

[57] ABSTRACT

The invention relates to an improvement of the known process for spinning poly(p-phenylene terephthalamide) via an air gap spinning process. It comprises mixing poly(p-phenylene terephthalamide) with concentrated sulphuric acid by a freezing process, heating the solid mixture, and passing the resulting solution to the spinning orifices under pressure. It involves the use of a mixing kneader to convert the solid mixture into a spinning solution.

6 Claims, No Drawings

PROCESS FOR MAKING FIBRES FROM POLY(P-PHENYLENE TEREPHTHALAMIDE)

BACKGROUND OF THE INVENTION

The invention relates to a process for making fibres from a polyamide consisting wholly or for the most part of poly(p-phenylene terephthalamide) in which a spinning mass is prepared by cooling concentrated sulphuric acid of at least 98 wt. % content to below its coagulation point, subsequently combining the thus cooled sulphuric acid with the polyamide and mixing them to form a solid mixture containing, calculated on the weight of the mixture, at least 15% of the polyamide having an inherent viscosity of at least 2.5, and then heating the resulting solid mixture and passing it, under pressure, to spinning orifices, and spinning it by means of an air gap spinning process.

Such a process is known from Netherlands patent application 7904495 laid open to public inspection. It was found that with the aid of this so-called freezing process proper mixing of sulphuric acid and poly(p-phenylene terephthalamide) could be achieved. However, the resulting sandy solution lacks sufficient homogeneity for immediate processing after being melted. For this reason the sandy solution is heated in an extruder prior to being spun. Not all drawbacks are obviated by this procedure, however. Since not every polymer granule will absorb the same quantity of sulphuric acid, the sulphuric acid:polymer ratio on a microscopic scale differs from the set macroscopic scale ratio. This will give inhomogeneities during melting. Furthermore, it was found that favourable results in actual practice are highly dependent on precise settings for the pressure build-up and the variation in temperature in the extruder. In consequence, there is a considerable risk of failure of the extruder process. It was also found to be advisable in actual practice to compress the sandy solution in the cold state, which severely curtails the options to increase or change the process capacity.

It has also been proposed to prevent inhomogeneities in the poly(p-phenylene terephthalamide) spinning solution by means of an improved process of dissolving poly(p-phenylene terephthalamide) in sulphuric acid. A two-step mixing process to this end in which poly(p-phenylene terephthalamide) and sulphuric acid are successively mixed in a small twin-screw mixer operated at high speed and a large twin-screw mixer operated at low speed is known from Research Disclosure 232 004. Such a process has nothing to do with eliminating the drawbacks to the known freezing process, nor does it have the advantages provided by said process.

From WO 92/07120 it is known to modify a poly(p-phenylene terephthalamide) spinning solution by the addition thereto of solution containing additives. A static mixer unit is employed to this end. This process has nothing to do with improving the aforementioned freezing process either.

DESCRIPTION OF THE INVENTION

The invention has for its object to eliminate the drawbacks to the known freezing process. To this end the invention consists in that in a process of the known type mentioned in the opening paragraph the heating and pressurising of the solid mixture is carried out in a device in which the polymer solution passes through at least two successive zones, i.e., a melting zone and a pressure build-up zone, with the polymer solution being kneaded as well as mixed in at least the melting zone.

Since in the melting zone the polymer solution is transformed from a granular structure (containing many voids) into a liquid, the degasification of the polymer solution by means of a vacuum preferably takes place in this zone.

The conventional extruders combine a number of functions, i.e., kneading, mixing, melting, degasification, and pressure build-up. It was found that not only the process capacity and controllability, but also the homogeneity of the spinning solution, the quality of the yarn, and the loop and cord strengths can be enhanced by dividing these functions between at least two separate zones, a melting zone and a pressure build-up zone.

Further, it was found that the process according to the present invention allows the production of spinning solutions having a higher concentration of poly(p-phenylene terephthalamide) than was possible with a process using an extruder. Spinning of solutions having a higher concentration of poly(p-phenylene terephthalamide) results in filaments having improved physical properties (higher modulus and strength). Consequently, by enabling the use of higher concentrations of poly(p-phenylene terephthalamide), the process according to the present invention provides an additional improvement (to those already mentioned) of the physical properties.

A device pre-eminently suited to be used as a melting zone is the "mixing kneader." Mixing kneaders are known from, int. al., CH 673 617, CH 661 450, EP 422 454, and EP 451 747. Preferably, a continuously operating mixing kneader such as described in EP 451 747 is employed. Such mixing kneaders (available from LIST) have the advantage of comparatively good plug flow characteristics, i.e., a low dwell time distribution. In the process according to the invention the dwell time in the mixing kneader can vary from 15 minutes to several hours, with a dwell time of more than 30 minutes being preferred. The mixing kneader usually operates at a filling level ranging from 25 to 70%.

Mixing kneaders such as those preferably used in the process according to the invention comprise a hollow, rotating shaft equipped with a number of kneading paddles or kneading blades. The shaft is arranged in a cylindrical housing optionally having a number of kneading hooks on the inside. The paddles and hooks are arranged relatively to one another in such a way as will give no, or the lowest possible number, of dead pockets and prevent encrustation of the shaft or the cylindrical housing. In addition, a heating medium, e.g., water, flows through the shaft and, optionally, the paddles or blades mounted on it. The cylindrical housing can also be heated.

Needless to say, the transport of the polymer solution through the mixing kneader has to proceed at a certain rate. Such can be attained, e.g., by placing several paddles or blades along a single helical line. In that case, the movement of the polymer solution will be effected by the arrangement of the paddles relatively to one another. Such a movement can also be achieved by mounting the paddles or blades on the rotating shaft each along their own helical line. The paddles or blades (or sections of these, such as scraping devices) will then be positioned at an angle to the longitudinal axis of the rotating shaft and will each individually bring about a movement of the polymer solution.

Most of the offset lines are "positive." This means that movement in the direction of transport is promoted. However, it is also possible to have one or more "negative" offset lines (promoting the movement in the direction opposite to the direction of transport). These "negative" offset lines can be used, e.g., to adjust the dwell time distribution and the filling level distribution as desired.

When the mixing with kneading takes place under a vacuum, there is very thorough degasification of the spinning solution. In order not to disturb the vacuum, the mixing kneader can be fed alternatingly from two bunkers in vacuum, which are connected to the filler inlet of the mixing kneader by turns. Alternatively, the mixing kneader can be fed using a vacuum lock which periodically lets through a certain quantity of polymer solution.

On leaving the melting zone, the polymer solution enters the pressure build-up zone. While a wide range of pumps is suitable for use in the pressure build-up zone, the pump preferably used is a so-called "booster pump," since a pump of this type operates at a low suction pressure and in addition provides a high pressure build-up.

Since the vast majority of pumps suitable for use in said pressure build-up zone require a certain pre-pressure (say, 2 or 6 bar), it is necessary as a rule, and especially with degasification under a vacuum, to increase the pressure in the polymer solution before it reaches the pump. For the pressure build-up use can be made of, e.g., a "lobe pump."

However, it has been found that the pressure in the polymer solution can easily be raised by providing a discharge screw at the end of the mixing kneader's rotating shaft. By using such a discharge screw the pressure in the polymer solution can be increased sufficiently, thus obviating the need for an additional pump together with driving mechanism.

The pressure build-up can also be favourably affected by cooling the final section of the mixing kneader.

To increase to some extent the filling level of the section of the mixing kneader in which the discharge screw is present, a baffle can be placed just upstream of the discharge screw.

In addition, the end of the discharge screw can be fitted with a viscous seal, so that the polymer solution will be backed up at the end of the discharge screw. On the one hand this guarantees that the section of the mixing kneader containing the discharge screw remains sufficiently filled, on the other it prevents the glands between the rotating shaft and the cylindrical housing from being overloaded or over-contaminated.

The process according to the present invention will be illustrated by way of the embodiment below. For details of a preferred continuous plug flow mixing which are not discussed reference may be had to European patent application no. 451 747 mentioned hereinbefore.

The mixing kneader is made up of a cylindrical vessel equipped with stationary transport paddles, kneading paddles, kneading hooks, an inlet, a discharge screw, and a baffle. Via the inlet the sandy polymer solution is alternatingly fed to the mixing kneader at room temperature. The temperature can be measured at different sites using temperature measuring points.

In the melting zone, which is equipped with kneading paddles, kneading hooks, and an opening for creating a vacuum, the polymer solution is melted at about 80°–95° C. and kneaded.

Next, the polymer solution is discharged via the discharge screw. The polymer solution is fed to a booster pump, where the pressure is increased sufficiently to pass the spinning solution to the spinning pumps.

The spinning solution is then passed via a central filter to the spinning orifices, where it is subjected to a conventional air gap spinning process such as described in, e.g., U.S. Pat. No. 3,414,645 and U.S. Pat. No. 4,016,236.

The process according to the present invention was found to have various advantages. For instance, a very coarse solution or a solution containing a large quantity of inhomogeneities and even undissolved material can also be processed without any problem. Besides, as compared with the known process there is a major improvement in the spinning solution's homogeneity on a micro scale. It was further found to be easier to increase the capacity of the process according to the present invention, since virtually the only thing that needs to be taken into consideration is the required melting heat of the solution.

Alternatively, the mixing kneader can be fed a polymer solution having a higher polymer concentration than the final spinning solution. In that case, sulphuric acid or oleum can be added to the mixing kneader to adjust the spinning solution concentration at a much later stage than is possible when use is made of an extruder. This enhances the process's controllability and prevents the process having to be shut down on account of too great variations in the polymer concentration.

It has further been found that the yarn spun by the process according to the present invention is of improved quality. Another significant result is the improvement found in greige cord strength and loop strength.

It is noted that WO94/06530 describes a process for making a very specific cellulose solution by means of a thin-film evaporator which, in turn, is very specifically described. WO94/06530 neither relates to sandy aramid solutions nor addresses the problems involved in using an extruder to process said sandy solutions.

It is further noted that U.S. Pat. No. 3,873,072 describes an apparatus for kneading a wax-like substance into a molten polymer. Within said apparatus the wax and the polymer are kneaded such that the wax is uniformly finely dispersed in the polymer as a separate and distinct phase. The wax particle size and distribution should fall within a specified range so as to ensure optimum protection against build-up of static electricity. U.S. Pat. No. 3,873,072 fails to mention or suggest that when it is combined with a separate pressure build-up device, the apparatus for mixing and kneading can advantageously be used to solve the problems related to the use of an extruder in processing sandy aramid solutions made with the freezing process.

The invention will be further illustrated with reference to the following unlimitative example.

EXAMPLE

The mixing kneader employed was a LIST DTB-60 with four compartments and a mixing shaft. Between the first and second compartments was placed a blind baffle to reduce the overall operating volume of the mixing kneader. Between the second and third compartments and the third and fourth compartments, respectively, was placed a baffle having a cross-section of 11% and 42%, respectively, of the mixing kneader cross-section. In the fourth compartment the mixing shaft was fitted with a discharge screw.

The wall of the second compartment (the melting zone) had a temperature of 88° C., the wall of the third compartment (the degasification zone) and of the fourth compartment had a temperature of 85° C. The mixing shaft was kept at a temperature of 90° C. and rotated at a speed of 40 revolutions per minute. The mixing kneader was kept under a vacuum of 30 mbar, the filling level was set at 50% ±5.

Via a vacuum lock having a feeding capacity of 40 kg/h a solid polymer solution consisting of 80.5 wt. % of sulphuric acid and 19.5 wt. % of poly(p-phenylene terephthalamide) was introduced into the second compartment of the mixing kneader. The dwell time of the polymer solution was about 90 minutes.

The molten spinning solution was fed to the spinning orifices via a booster pump (Transmark™) and a transport pump (Slack & Parr™) with a throughput of 40 kg/h and spun into filament yarns by means of a conventional air gap spinning process.

The filaments obtained by the mixing kneader and extruder processes have the following properties (determined in accordance with ASTM standard D885M-95):

|  |  | Mixing kneader | Extruder |
|---|---|---|---|
| Yarn linear density | (dtex) | 1715 | 1726 |
| Number of filaments | (—) | 1000 | 1000 |
| Breaking force | (N) | 356 | 345 |
| Elongation at break | (%) | 3.55 | 3.50 |
| Loop breaking strength | (N) | 314 | 290 |
| Loop breaking efficiency | (%) | 44 | 42 |
| Cord strength | (N) | 597 | 566 |
| Cord efficiency | (%) | 84 | 82 |

Using the mixing kneader allows for an easy increase in the process capacity or an easy change thereof. The example further shows that the mechanical properties of fibres made by the process according to the invention are superior to those of fibres where the spinning solution is prepared using an extruder.

When the polymer solution as it leaves the mixing kneader and a polymer solution as it leaves an extruder are each spread between two sheets of glass, the difference is clearly visible to the eye. The solution obtained using the mixing kneader is more homogeneous, has been degassed more thoroughly, and contains fewer solid particles.

We claim:

1. A process for making fibres from a polyamide consisting essentially of poly (p-phenylene terephthalamide) in which a spinning mass is prepared by cooling concentrated sulphuric acid of at least 98 wt. % content to below its coagulation point, subsequently combining the thus cooled sulphuric acid with the polyamide and mixing them to form a solid mixture containing, calculated on the weight of the mixture, at least 15% of the polyamide having an inherent viscosity of at least 2.5, and then heating the resulting solid mixture to transform it to a liquid, and passing it to spinning orifices under pressure, and spinning it by means of an air gap spinning process, characterized in that the heating and pressuring of the solid mixture is carried out in a device in which the polymer solution passes through at least two separate zones, a melting zone and a pressure built-up zone in succession, with the polymer solution being kneaded as well as mixed in at least the melting zone.

2. A process according to claim 1, characterised in that the polymer solution is degassed in the melting zone with the aid of a vacuum.

3. A process according to either claim 1, characterised in that the melting zone comprises a mixing kneader having a rotating shaft equipped with a number of kneading paddles or kneading blades, said shaft being arranged in a cylindrical housing.

4. A process according to claim 3, characterised in that a discharge screw is fitted at the end of the rotating shaft.

5. A process according to claim 4, characterised in that at least one baffle is placed just upstream of the discharge screw.

6. A process according to any one of the preceding claims, characterised in that the spinning solution in the pressure build-up zone is passed to the spinning orifices with the aid of a booster pump.

* * * * *